United States Patent [19]
Beyn

[11] 4,042,653
[45] Aug. 16, 1977

[54] PROCESS FOR SPRAY FORMING OF DISCRETE PARTICLES

[75] Inventor: Edgar Joachim Beyn, Annapolis, Md.

[73] Assignee: SCM Corporation, New York, N.Y.

[21] Appl. No.: 493,323

[22] Filed: July 31, 1974

[51] Int. Cl.[2] .......... B01J 2/02
[52] U.S. Cl. .......... 264/7; 264/12; 264/14; 264/117
[58] Field of Search .......... 264/6, 7, 13, 14, 12, 264/117

[56] References Cited

U.S. PATENT DOCUMENTS

| | | | |
|---|---|---|---|
| 2,529,466 | 11/1950 | Weldon | 264/7 |
| 2,797,201 | 6/1957 | Veatch et al. | 264/13 |
| 3,036,338 | 5/1962 | Nack | 264/7 |
| 3,059,280 | 10/1962 | Laehder | 264/14 |
| 3,121,639 | 2/1964 | Bauer et al. | 426/471 |
| 3,343,933 | 9/1967 | Mullan et al. | 264/7 |
| 3,621,902 | 11/1971 | Okada | 426/471 |
| 3,666,523 | 5/1972 | Nau | 264/117 |
| 3,880,968 | 4/1975 | Kaspar | 264/117 |

*Primary Examiner*—Robert F. White
*Assistant Examiner*—James R. Hall
*Attorney, Agent, or Firm*—Richard H. Thomas

[57] ABSTRACT

A process for forming an atomized stream of a sprayable substance in a conversion zone, which may be a drying zone or a congealing zone, and forming discrete particles of said stream in said zone. The present invention comprises intercepting the stream of atomized droplets with a fluent binder capable of agglomerating fines in the stream facilitating their collection.

The invention is particularly described with reference to the spray drying of pigment particles.

13 Claims, 4 Drawing Figures

PROCESS FOR SPRAY FORMING OF DISCRETE PARTICLES

The present invention relates broadly to a process for forming an atomized stream of a sprayable substance in a conversion zone, which may be a drying zone, and particularly to an improved method for reducing the amount of fines resulting from the atomization and conversion steps.

The invention is particularly applicable to the spray drying of pigments such as titanium dioxide, and will be described with reference thereto, although it will be apparent to those skilled in the art that the invention has other applications. Such applications within the scope of the present invention include producing encapsulated condiment particles, e.g., liquid, vapor or solid phase seasoning, flavoring, salting, sweetening, souring, spicing, proteinaceous and/or coloring ingredients, by spray drying or chilling, wherein the binder is a lipoidal, sacchariferous, or proteinaceous material.

BACKGROUND OF THE INVENTION

Copending application Ser. No. 318,481, filed Dec. 26, 1973, now U.S. Pat. No. 3,843,380 on a "Process for Spray Drying Pigment", assigned to assignees of the present application, describes a process for spray drying pigment particles, e.g., pigmentary titanium dioxide, in which a slurry of the pigment particles in water is prepared with about 0.1 to about 5% of a water-dispersible thickener, the thickener being defined as capable in small concentrations of less than about 5.0% of visibly thickening when added to water. Water soluble or water-dispersible organic colloidal high molecular weight thickeners are well known in the art. Particularly suitable thickeners for the invention of said co-pending application are water-soluble polymerized alkylene oxides, for instance ethylene oxide polymers described in prior U.S. Pat. Nos. 2,866,761, 2,914,491 and 2,917,470, marketed under the Union Carbide trademarks Polyox WSR N-10, molecular weight 100,000;. and Polyox WSR N-80, molecular weight 200,000. Another class of thickeners which can be employed are the esters of polyalkylene glycol or glycerol and fatty acids such as water-dispersible glycerol esters of higher fatty acids such as stearic acid, e.g. Arlacel 165 (trademark Atlas-ICI) having an HLB value near 11. Other suitable thickeners such as the glycol esters of higher fatty acids, ethoxylated sterols, the ammonium salt of a partial ester of methylvinyl ether/maleic anhydride copolymer and ethoxylated lauryl alcohol, polyvinyl alcohol, alkylene metal caseinates, natural gums including gum tragacanth, locust bean gum, caraya gum, guar gum, polyacrylates, polyacrylamides and others are given in said co-pending application. Still another class of thickeners are the cellulosic-type thickeners such as hydroxy propylmethyl cellulose and hydroxy ethyl cellulose.

It was found that the addition of such thickeners to the pigment slurry prior to spray drying resulted in an efficient collection of fines producing an essentially dustless product in which there was little or no loss of pigment in cyclone separation following drying.

It was also found that the pigments prepared in accordance with the invention of the co-pending application could readily be bulk handled and bulk stored without caking and destroying their free-flowing properties.

The invention of the copending application is suitable for the preparation of pigments for plastic and also latex and solvent grade paints. The thickeners are employed in amounts of about 0.3% for pain pigment grades and of about 0.1% for plastic pigment grades. Up to 2.0% of the thickener can be employed however. A feature of the invention of the copending application is that the thickener should be soluble or the bonds formed thereof should be readily destructible in the paint or plastic system to which the pigment is added to render the pigment readily dispersible in such system.

The invention of the copending application is particularly applicable to the spray drying of titanium dioxide.

The disclosure of said copending application Ser. No. 318,481 is incorporated herein by reference.

BRIEF SUMMARY OF THE INVENTION

The present invention in its broadest aspect comprises introducing a fluent binder into a pattern of spray droplets formed by atomizing a sprayable substance, at least a fraction of which is solid, in a conversion zone, the pattern including a first group of droplets of solid particulate matter and bonding agent having a droplet size within a range and a second group of droplets of finer size less than the sizes in said range, for the purpose of agglomerating fines or said finer size droplets resulting from the atomizing process. The atomizing may be by spraying or other means. The conversion zone may be a drying zone, cooling zone or other means capable of producing discrete particles having an ostensibly dry surface.

The fluent binder may be any material capable of being dissolved in a fugitive carrier or solvent and capable of bonding discrete particles and forming aggregates thereof under the conditions of the conversion zone. In an alternate sense, it is any material capable of forming a dry or congealed surface residue on the discrete particles under the conditions of the conversion zone.

Specifically, the fluent binder may be any lipoidal, sacchariferous, proteinaceous, resinous or other material including but not limited to such materials as the polyethylene glycols, the polyethylene oxides, solid esters of organic acids, cellulosic derivatives such as carboxy ethyl cellulose, rosin and derivatives thereof, the acrylics, and carbohydrates. Prior application Ser. No. 318,481 (U.S. Pat. No. 3,843,380) contains a disclosure of a large number of thickeners and surfactants useful in the invention thereof. The auxiliary binder of the present invention, in addition to the above materials, can be any of the thickeners and surfactants, or combinations thereof, listed in said application.

The present invention is not limited to spraying to achieve atomization or the formation of small droplets. The substance introduced into the conversion zone for drying, cooling or other conversion can be characterized as sprayable, but the introduction of the substance into the conversion zone can be by any means, which includes spraying, capable of atomization and the formation of droplets.

The conversion process of the present invention broadly can be any drying, chilling or other process for the purposes of coating particles, e.g. condiments, encapsulation, reinforcing coatings, increasing particle size, coloring, changing texture, and other such purposes, or simply for the purpose of forming aggregates of discrete particles, such as aggregates of pigment particles.

Many examples of such conversion processes are disclosed in copending applications Ser. No. 493,324, now U.S. Pat. No. 3,949,094, on "Improved Condiment-Treating Process and Product"; S. N. 493,325, now U.S. Pat. No. 3,985,913 on "Condiment Encapsulation by Spray Drying"; and Ser. No. 493,327, now U.S. Pat. No. 3,949,096 on "Improvement in Spray Drying Process for Encapsulation of Condiment Particles", all filed the same date as this application and assigned to assignee of the present invention, by Lawrence A. Johnson and Edgar J. Beyn, having assignee's file Nos. I-2109, I-2110 and I-2110-A, respectively. The disclosures of said copending applications are incorporated by reference herein. Disclosed in said applications are additional fluent binders which may be employed; e.g., lipoidal, sacchariferous and proteinaceous materials.

In a narrower aspect, the invention of this application relates to the spray drying of pigments in which a pigment slurry containing a fraction of pigment and a fraction of a thickening agent is spray introduced into a drying zone forming a pattern of droplets of various size. A fluent binder is then introduced into the pattern of spray droplets agglomerating fines resulting from the spraying and drying steps.

An aspect of the present invention is that an improved collection of fines can be achieved with the use of less thickener, improving the optical properties of the paint or plastic system to which the pigment is added.

In particular, the present invention resides in a process for spray drying pigment particles comprising the steps of forming a fluent slurry of pigment particles in a fugitive carrier; atomizing said slurry, said slurry containing an organic thickener material capable of bonding said pigment particles into aggregates, said binder being destructible in the paint or plastic system to which the pigment is added; discharging said slurry in a preferably swirling path into a heating zone for a time and at a temperature sufficient to volatilize said carrier; and recovering said dried pigment; the improvement comprising spraying to or intercepting the stream of formed droplets resulting from said discharging step with an auxiliary amount of binder, the auxiliary binder collecting fines emanating from the stream and forming aggregates thereof.

An aspect of the invention resides in the provision of a multi-component spray nozzle comprising a central, axial passage for the discharge of the pigment-thickener slurry; an annular passage encompassing the central passage and connected with a suitable source of air for atomizing the discharged slurry and providing a spray pattern; and nozzle means peripheral to the annular passage in communication with the auxiliary binder material, in the form of one or more injection needles disposed on one or opposite sides and in front of the annular passage and at an angle to the axis of movement of the atomized stream, aimed at and in the direction of the movement of the stream. The angle of the nozzle means can be from parallel or near parallel with the axis of movement of the atomized stream to 90° with respect to such movement, or even upstream or against the movement of the atomized stream. Preferred angles are 60° to 90° with regard to such movement.

By the invention, an improved efficiency of collection of fines is achieved with as little as 1-2 grams thickener per 100 grams of pigment.

Preferably, the pigment or other solid particle slurry contains 0.1-0.8% thickener and about 0.4-1.0% dispersant. The auxiliary binder slurry may contain about 0.6-1.2% organics therein and may be fed to the conversion zone at approximately the same rate as the main slurry. The total deposition of organics on the pigment or other solid particles preferably is in the range of about 0.8-2% based on the weight of dried solid particles.

In the case of the drying of $TiO_2$ pigment particles, the concentration of $TiO_2$ in the atomized slurry preferably is about 30-50%, the spray drying taking place at an initial temperature of about 300°-400° F. and a final temperature of about 120°-225° F.

BRIEF DESCRIPTION OF THE DRAWING

The invention may best be understood with reference to the accompanying drawings in which.

Figure 1:
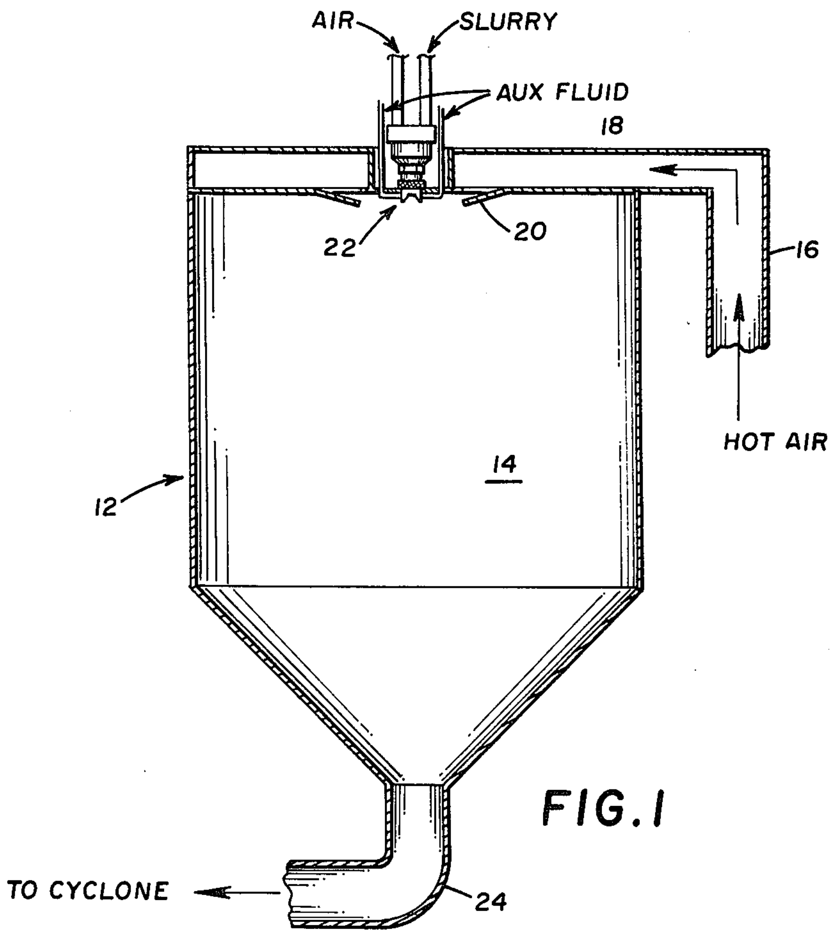
FIG. 1 is an elevation view of a spray dryer in accordance with the concepts of the present invention.

Referring to the drawings, and in particular FIG. 1, the spray dryer 12 is of the co-current type in which hot air and material to be dried are both introduced at the upper end of the dryer for flow downwardly through the heating chamber 14. Hot air is introduced into the dryer by means of conduit 16 through distribution chamber 18 exiting into the heating chamber 14 via louvers 20. The latter encompass or embrace a spray nozzle tip 22 axially located at the upper end of the heating chamber, the material to be dried introduced into the chamber by means of the nozzle tip. The louvers are designed to introduce the hot air into the dryer in the form of a swirling flow path.

The hot air and material to be dried after passing through the heating chamber 14 exits in lower conduit 24 for flow to a cyclone separator (not shown) where the dried material is separated from the hot air and collected.

The particular spray dryer illustrated in the drawing is a Komline-Sanderson, R&D model, having a capacity of 200,000 BTU per hour.

Figure 2:
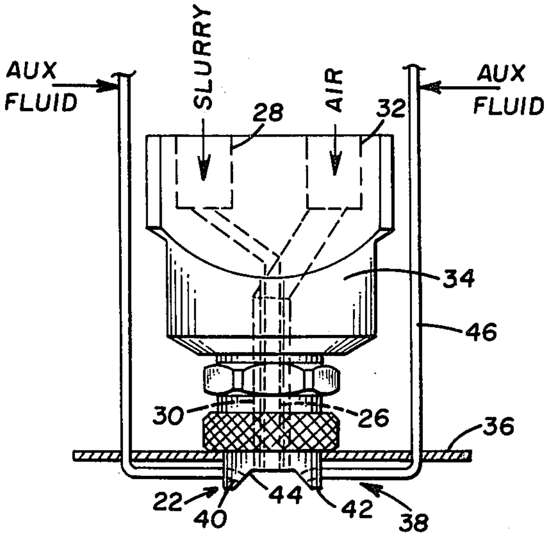
FIG. 2 is an enlarged elevation view of a spray nozzle employed in the dryer of FIG. 1, in accordance with the concepts of the present invention.

Referring to FIG. 2, the spray nozzle tip 22 of the present invention is a multi-component nozzle comprised of an axial passage 26 for the flow of slurry to be dried, the passage being connected by conduit 28 with a suitable source of slurry material. The axial passage is encompassed by an annular air exit passage 30 connected via air conduit 32 to a suitable source of pressurized air. The purpose of the air in air exit passage 30 is to atomize the slurry material introduced to the heating chamber in axial passage 26.

Both the fluid conduit 28 and air conduit 32 are positioned in an adapter 32 threaded onto the upper end of the multicomponent nozzle tip 22. The nozzle tip in turn is welded to a washer-like disc 36 by which the nozzle is held in place in the upper end of the dryer 12.

In accordance with the concepts of the present invention, the nozzle tip is provided with an auxiliary nozzle means 38 (FIG. 2) comprising a pair of small injection needles 40 disposed on opposite sides of the annular air exit passage 30 aimed towards and in the direction of movement of the spray pattern. As illustrated in FIG. 2, (and also FIG. 3), the injection needles are disposed in a cap 42, threaded onto the nozze top 22, having sloped frusto-conical surfaces 44 angled downwardly and outwardly from the axis of the nozzle tip at an angle of about 60° with reference to the axis of the axial passage 26. Thus the injection needles 40 make an angle of about 60° with regard to the horizontal. The injection needles 40 are each connected by means of lines 46 with a suitable source of supply of auxiliary binder.

In a particular example in accordance with the present invention, the spray nozzle tip 22 and cap 42 were supplied by Spraying Systems Company of Wheaton, Illinois. The components employed in the multi-component nozzle were as follows: The nozzle tip 22 containing axial passage 26 and air passage 30 is identifiable as "Fluid Cap 2050", having an axial opening of 0.05 inches. The cap of 42 is identifiable as "Air Cap 122281-60" having nozzle openings of 0.122 inches. This cap is a standard piece of equipment for modifying the spray pattern of the flow from the "Fluid Cap 2050". Conventionally, the openings in the "Air Cap" are connected to a source of air. The cap in accordance with the present invention was modified so that the needle openings 40 were in communication via stainless steel tubing 46 of 0.049 inches O.D. (0.008 inches wall thickness) with a supply of auxiliary binder.

Figure 3:
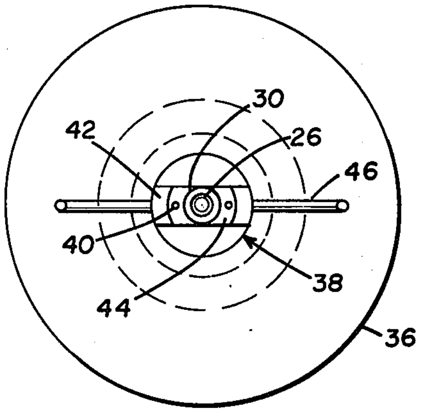
FIG. 3 is a plan view of the spray nozzle of FIG. 2.
Figure 4:
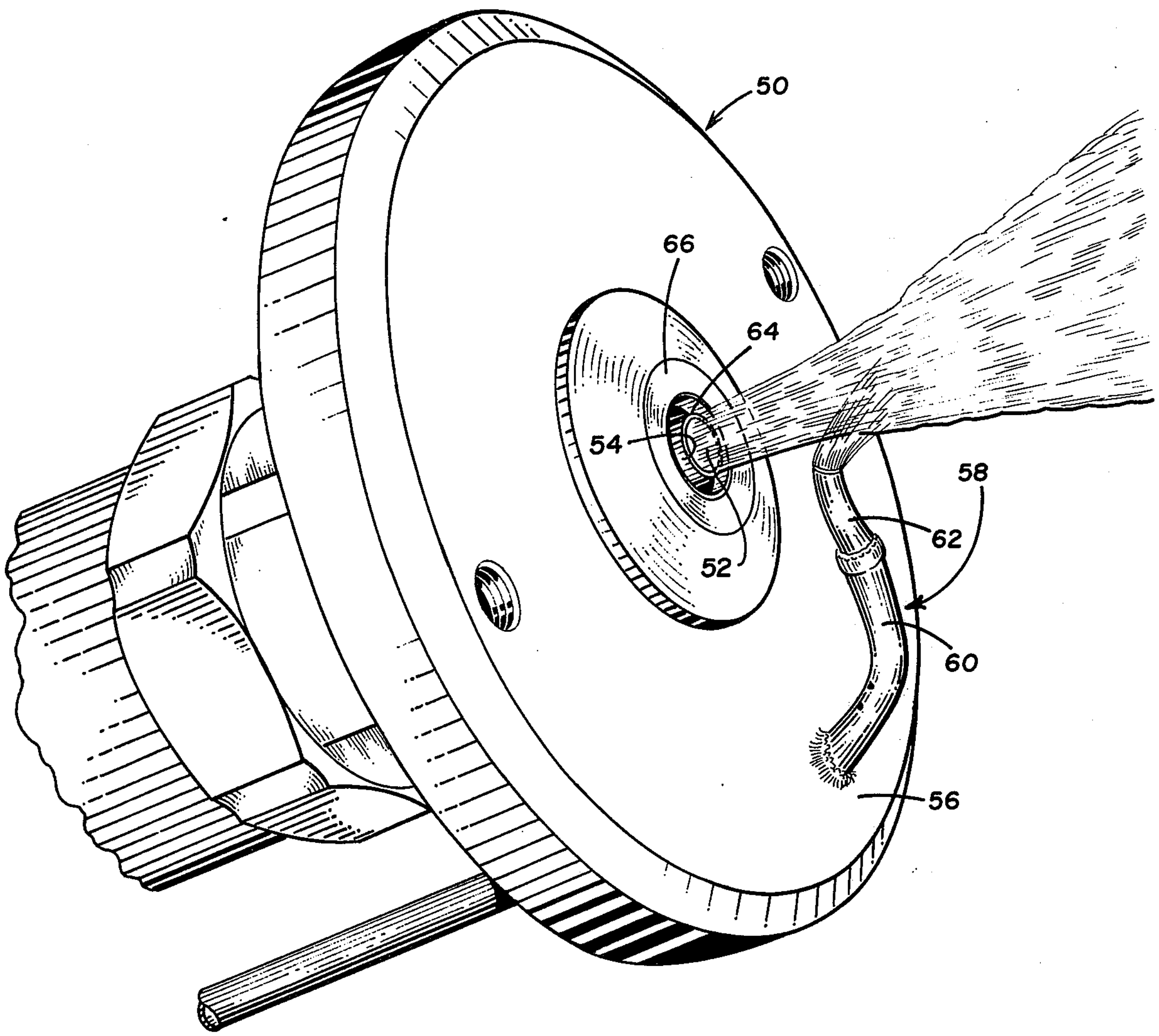
FIG. 4 illustrates an embodiment of the invention.

An embodiment of the invention is illustrated in FIG. 4. The difference between this embodiment and that of FIGS. 2 and 3 is that only one injection needle is employed in the embodiment. Specifically, there is shown in FIG. 4 a spray nozzle tip 50, similar to that of FIGS. 2 and 3, having an axial passage 52 for the flow of slurry to be dried and an annular air exit passage 54. As in FIGS. 2 and 3, the nozzle tip is attached to a washer-like disc 56 by which it is held in place in the upper end of the dryer.

In this embodiment, the auxiliary binder is caused to intercept the slurry-air stream from the nozzle tip 50 by means of a single injection needle 58 in the form of a bent tube 60, penetrating disc 56, and an injection needle end 62. The injection needle end 62 has the same dimensions as those of FIGS. 2 and 3, namely 0.049 inches O.D. and 0.008 inches wall thickness. The nozzle tip is composed of the Spraying Systems Company components as follows: "Fluid Nozzle 60100" and "Air Cap 120". These items are designated in FIG. 4 with the numerals 64 and 66, respectively.

In the embodiment of FIG. 4, the injection needle is positioned approximately 0.25 inches in front of the air cap 66 and terminates slightly outside the diameter of the air cap opening, viewing the nozzle tip from the front.

As pointed out with reference to the embodiment of FIGS. 2 and 3, the injection needle may make any of a number of angles with the nozzle tip spray stream. In the embodiment of FIG. 4, the injection needle makes an angle of about 90° with the spray stream. The flow from the injection needle is quickly deflected to a path more parallel with the nozzle tip spray stream when exposed to the force of the nozzle tip spray stream.

FIG. 4 illustrates the manner in which the auxiliary fluid intercepts the nozzle tip spray stream. In essence, the fluid flow from nozzle 64 is in the form of a straight stream encompassed by the annular air stream. Atomization begins to take place at about the elevation of the injection needle. The flow of auxiliary binder is actually into the annular air stream, and mixing of the binder with atomized particles takes place further downstream after substantial atomization takes place. Complete mixing of atomized particles and auxiliary binder occurs with contact of the atomized particles with the swirling drying air from dryer louvers 20 (FIG. 1).

It will be apparent to those skilled in the art that the specific sizing, shape and location of the above components can be varied, depending upon the dryer employed and coversion process involved.

EXAMPLE

A chloride process latex grade titanium dioxide, following surface treatment, was washed, dewatered, and refluidized by the addition of aqueous ammonia and water. The slurry contained 50.6% solids by weight. The slurry was then subjected to sand milling and divided into two batches.

FIRST BATCH

The first batch had added to it an aqueous solution of Union Carbide Polyox resin WSR N-750, Dow polyethylene glycol PG-E-6000, and a technical grade of propylene glycol, in 900 milliliters of water, at the following levels:

| | |
|---|---|
| Polyox | 0.3% |
| PG-E-6000 | 0.6% |
| Propylene glycol | 1.0% |

based on pigment weight in the slurry.

The slurry was then spray dried in the apparatus of FIGS. 2 and 3, by feeding it at the rate of 45 milliliters per minute into the two fluid nozzles. No auxiliary fluid was fed to the injection needles.

The spray dryer was a Komline-Sanderson R&D model, and was run at an inlet temperature of 300° F and an exit temperature of 208° F. Atomizing pressure of the spray slurry was 130 psig.

Fines in the off-gas were rated as light. There was no caking in the collector or cyclone, and some caking on the dryer chamber wall. The resulting product had a free-flowing, relatively dense, slightly dusty appearance and was cake resistant.

A 25 gram quantity of the pigment powder was sifted through a 24 mesh screen and a funnel into a measuring cup placed 16 inches below the funnel in still air. With increasing dustiness, an increasing amount of powder disperses during the fall and deposits outside of the cup. As a standard, an alumina powder of 80-200 mesh size was tested in the same way. The following results were obtained.

TABLE I

| Sample | Amount Collected In Cup | % Dustiness vs. Standard |
|---|---|---|
| Alumina 80-200 mesh | 24.5 grams | 0% |
| First Batch Run I | 21.3 grams | 13% |
| First Batch Run 2 | 21.2 grams | 13% |

SECOND BATCH

The second batch containing 50.6% solids had added to it Union Carbide Polyox and propylene glycol, in 300 milliliters in water, at the following levels, based on pigment solids content;

| | |
|---|---|
| Polyox | 0.1% |
| Propylene glycol | 1.0% |

An auxiliary binder slurry was prepared containing the following:

| Polyox | 0.8 grams resin per liter |
| Polyethylene glycol E-6000 | 4.78 grams per liter |

This slurry was pumped into the third fluid injection needles 40 at the same rate as the main slurry, supplying additional organic treatment as follows:

| Polyox | 0.1% |
| PG-E-6000 | 0.6% |

The organics from the main slurry and from the auxiliary slurry provided a total organics treatment level as follows:

| Polyox resins | 0.2% |
| Polyethylene glycol E-6000 | 0.6% |
| Propylene glycol | 1.0% |

Spray drying was the same as in the first batch except that a second feed pump was employed for the auxiliary binder of the same size and mechanically coupled to the main slurry feed pump.

Drying air inlet temperature was 300° F and exit temperature was 174° F. Atomizing pressure was 130 psig. As with the first batch, the fines in the off-gas were rated as light. There was again no caking in the collector or cyclone and only some caking on the dryer chamber wall.

The product had a free-flowing, relatively dense, slightly dusty appearance and was cake-resistant, as in the first batch. This batch was subjected to the same dustiness test as Batch 1, with the following results:

TABLE 2

| Sample | Amount Collected In Cup | % Dustiness vs. Standard |
|---|---|---|
| Alumina 80–200 mesh | 24.5 grams | 0 |
| Second Batch Run 1 | 22.2 grams | 9% |
| Second Batch Run 2 | 22.0 grams | 10% |

Overall, the pigments of Batches 1 and 2 were very similar. However the refined dustiness test showed substantial reduction in dustiness or quantity of fines employing the concepts of the present invention. This was accomplished despite a ⅓ reduction in the amount of Polyox used in Batch 2. Also angle of repose measurements showed slightly better free-flow characteristics for Batch 2.

Various other materials can be spray dried, for example animal blood, yeast, milk, cream, zinc sulfate, lignin, aluminum hydroxide, silica gel, magnesium carbonate, tanning extract, coffee, magnesium chloride, detergents, manganese sulfate, aluminum sulfate, urea resins and sodium sulfide.

Fines emanate from the spray pattern of such materials and in many cases it is desired to encapsulate or bind such materials during the spray drying process, for example yeast with a fat or coffee with an emulsifier. Thus, agglomeration and collection of fines of such spray dried materials may be necessary or desirable and such fines collection of these and other materials can be accomplished according to the precepts of this invention.

Agglomeration and collection of fines with an auxiliary spray or binder can be improved additionally by subjecting each such spray to an equal but opposite electrostatic charge (for example, a positive charge to the pigment slurry and a negative charge to the auxiliary binder slurry). The opposite charged spray particles would tend to be attracted to each other to further promote agglomeration of fines. U.S. Pat. No. 3,208,951 discloses a method of encapsulation of a liquid (for example, water, glycerine or ethylene glycol) in aerosol form by an encapsulating substance (for example, a wax or synthetic resin) wherein the two sprays are given equal but opposite electrostatic charges to produce 10–60 micron encapsulated particles. The disclosure of said reference is expressly incorporated herein by reference.

What is claimed is:

1. In a process for forming and collecting aggregate particles from a sprayable substance which comprises a fraction of normally solid particulate matter and a fraction of a fluent bonding agent in addition to the solid matter, said process including the steps of:

a. atomizing said sprayable substance into a conversion zone;

b. said sprayable substance during said atomizing step forming a pattern of droplets of various sizes including a first group of droplets of solid particulate matter and bonding agent having a droplet size within a range and a second group of droplets of finer size less than the sizes in said range;

c. establishing in said conversion zone conditions for hardening said bonding agent and forming discrete aggregates of said first group of droplets having an ostensibly dry surface, said bonding agent on hardening having sufficient strength to bond the particulate matter to form said aggregates;

the improvement comprising:

1. intercepting said pattern of droplets with a spray of an auxiliary fluent binder also hardenable under conditions of the conversion zone;
2. maintaining said auxiliary binder and said pattern of droplets in an agitated state to mutually engage said second group of droplets of finer size and said auxiliary binder prior to hardening of the auxiliary binder forming additional aggregates of said second group of droplets of finer size and said auxiliary binder; and
3. removing said resulting aggregates from said zone.

2. The process of claim 1 wherein said conversion zone is a spray drying zone, the hardening of said bonding agent and auxiliary binder being carried out by drying with a gas heated to a sufficiently high temperature to effect said drying.

3. The process of claim 1 wherein said conversion zone is a congealing zone, the hardening of said bonding agent and auxiliary binder being carried out by cooling with a gas cooled to a sufficiently low temperature to effect said congealing.

4. The process of claim 1 wherein said sprayable substance comprises a pigment slurry.

5. The process of claim 1 wherein said auxiliary fluent binder is dispersible in water.

6. The process of claim 1 wherein said auxiliary fluent binder is dispersible in an organic solvent.

7. The process of claim 1 wherein the sprayable substance particulate matter is a condiment.

8. The process of claim 1 wherein said auxiliary fluent binder is a material selected from the group consisting of a resinous material, lipoidal material, sacchariferous material, proteinaceous material, and a mixture of the same.

9. A process for forming and collecting dried, aggregate, pigment particles suitable for addition to a pigment or plastics system comprising the steps of:

a. forming a fluent slurry of pigment particles in a fugitive vehicle, said slurry containing an organic thickener material capable on drying of bonding said pigment particles into aggregates, the resultant bond being destructible in the pigment or plastics system to which the aggregates are added;
b. atomizing said slurry into a heating zone;
c. said slurry during said atomizing step forming a pattern of droplets of various sizes including a first group of droplets of solid particulate matter and bonding agent having a droplet size within a range and a second group of droplets of finer size less than the sizes in said range;
d. heating said droplets for the time and at a temperature in said heating zone sufficient to volatilize said vehicle and harden said organic thickener material forming discrete aggregates of said first group of droplets having an ostensibly dry surface, said bonding agent on hardening having sufficient strength to bond the pigment particles to form said aggregates;

the improvement comprising:

1. intercepting said pattern of droplets with a spray of an auxiliary fluent binder also hardenable under conditions in the heating zone;
2. maintaining said auxiliary binder and said pattern of droplets in an agitated state to mutually engage said second group of droplets of finer size and said auxiliary binder prior to hardening of the auxiliary binder forming additional aggregates of said second group of droplets of finer size and said auxiliary binder; and
3. removing said resulting aggregates from said zone.

10. The process of claim 9 wherein said pigment is a plastics grade titanium dioxide, the concentration of titanium dioxide in the slurry being about 30–50%, said spray drying taking place at an initial temperature in the heating zone of about 300–400° F. and a final temperature of about 120°–225° F.

11. The process of claim 9 wherein the fluent slurry of pigment particles contains an organic dispersant in addition to organic thickener material, the auxiliary fluent binder comprising an organic binder material, the atomizing and heating steps resulting in the deposition on the pigment particles of organic compounds from the auxiliary binder and fluent slurry in an amount equal to about 0.8–2% organic compounds based on the weight of dried pigment.

12. The process of claim 10 wherein the auxiliary binder is in slurry form containing about 0.6–1.2% organic binder material therein, and the slurry of pigment particles contains about 0.1–0.8% thickener and about 0.4–1.0% dispersant, said slurry of pigment particles and auxiliary slurry being fed to the heating zone in approximately equal amounts.

13. The process of claim 12 wherein the slurry of pigment particles following atomizing defines a spray pattern having an annulus and a direction of movement, the auxiliary binder slurry being discharged into the annulus of the slurry of pigment particles at an angle towards the slurry of pigment particles and in the direction of movement of the slurry of pigment particles.

* * * * *